United States Patent
Hawes

(10) Patent No.: US 9,809,462 B2
(45) Date of Patent: Nov. 7, 2017

(54) PORTABLE PITCHER FOR FILTERING AND DISPENSING DRINKING WATER

(71) Applicant: Liquidity Corporation, Alameda, CA (US)

(72) Inventor: Michael Hawes, Orinda, CA (US)

(73) Assignee: Liquidity Nanotech Corporation, Concord, CA (US)

(*) Notice: Subject to any disclaimer, the term of this patent is extended or adjusted under 35 U.S.C. 154(b) by 1 day.

(21) Appl. No.: 15/059,814

(22) Filed: Mar. 3, 2016

(65) Prior Publication Data

US 2016/0257575 A1    Sep. 8, 2016

Related U.S. Application Data

(60) Provisional application No. 62/128,549, filed on Mar. 5, 2015.

(51) Int. Cl.

| B01D 39/14 | (2006.01) |
|---|---|
| C02F 1/00 | (2006.01) |
| B01D 71/26 | (2006.01) |
| B01D 71/42 | (2006.01) |
| C02F 1/44 | (2006.01) |

(Continued)

(52) U.S. Cl.
CPC .............. *C02F 1/003* (2013.01); *B01D 39/14* (2013.01); *B01D 71/26* (2013.01); *B01D 71/42* (2013.01); *C02F 1/44* (2013.01); *C02F 1/283* (2013.01); *C02F 1/42* (2013.01); *C02F 2201/006* (2013.01); *C02F 2307/04* (2013.01)

(58) Field of Classification Search
CPC ........ B01D 39/14; B01D 71/26; B01D 71/42; C02F 1/003; C02F 1/283; C02F 1/42; C02F 1/44; C02F 2201/006; C02F 2307/04

See application file for complete search history.

(56) References Cited

U.S. PATENT DOCUMENTS

| 5,186,830 A * | 2/1993 | Rait ...................... B01D 29/03 |
|---|---|---|
| | | 210/232 |
| 5,922,378 A * | 7/1999 | Kagan ..................... C02F 1/003 |
| | | 210/348 |

(Continued)

FOREIGN PATENT DOCUMENTS

| EP | 1056684 A1 | 12/2000 |
|---|---|---|
| EP | 2423167 A1 | 2/2012 |

OTHER PUBLICATIONS

International Search Report and Written Opinion dated Jul. 12, 2016 in connection with PCT/US2016/020662.

*Primary Examiner* — Frederick C Nicolas
*Assistant Examiner* — Bob Zadeh
(74) *Attorney, Agent, or Firm* — Locke Lord LLP; Scott D. Wofsy

(57) ABSTRACT

The apparatus for filtering and dispensing drinking water is disclosed which includes a container having an interior space with a dividing wall defining a first chamber for receiving unfiltered water and a second chamber for storing filtered drinking water, wherein a passage is formed through the interior wall adjacent a bottom surface of the container to provide fluid communication between the first and second chambers, and wherein at least one multi-layered filter pack is disposed across the passage to filter water flowing from the first chamber to the second chamber under force of gravity.

15 Claims, 2 Drawing Sheets

(51) Int. Cl.
*C02F 1/28* (2006.01)
*C02F 1/42* (2006.01)

(56) References Cited

U.S. PATENT DOCUMENTS

| | | | |
|---|---|---|---|
| 6,565,749 B1* | 5/2003 | Hou | A61L 2/0017 210/263 |
| 6,569,329 B1 | 5/2003 | Nohren, Jr. | |
| 6,733,669 B1 | 5/2004 | Crick | |
| 6,749,753 B1* | 6/2004 | Yamaguchi | B01D 29/111 210/315 |
| 6,998,058 B2* | 2/2006 | Koslow | A61L 2/0017 210/650 |
| 7,396,465 B2 | 7/2008 | Wu et al. | |
| 7,754,123 B2 | 7/2010 | Verdegan et al. | |
| 8,172,092 B2 | 5/2012 | Green et al. | |
| 8,641,891 B1 | 2/2014 | Crowder | |
| 2002/0134732 A1* | 9/2002 | Wiseburgh | B01D 61/16 210/739 |
| 2006/0163169 A1* | 7/2006 | Eckhardt | C02F 1/002 210/748.11 |
| 2006/0163174 A1* | 7/2006 | Namespetra | C02F 1/78 210/760 |
| 2006/0191824 A1* | 8/2006 | Arett | A47G 19/12 210/85 |
| 2007/0102332 A1* | 5/2007 | Bommi | B01D 21/0012 210/136 |
| 2008/0217807 A1* | 9/2008 | Lee | B01D 39/1623 264/172.18 |
| 2010/0133297 A1* | 6/2010 | Arett | A47G 19/12 222/129 |
| 2012/0031832 A1* | 2/2012 | Yamaguchi | B01D 29/111 210/450 |
| 2012/0111803 A1* | 5/2012 | Daniely | B01D 61/18 210/760 |
| 2012/0137885 A1* | 6/2012 | Dullaert | B01D 39/1623 96/12 |
| 2012/0298614 A1* | 11/2012 | Nelson | B65D 51/24 215/308 |
| 2013/0092622 A1 | 4/2013 | Kas et al. | |
| 2013/0139701 A1* | 6/2013 | Marconi | A47J 27/21183 99/296 |
| 2014/0046112 A1* | 2/2014 | Boyd | C07C 7/12 585/823 |
| 2015/0014241 A1* | 1/2015 | Wyhler | B01D 39/1623 210/497.01 |
| 2016/0250573 A1* | 9/2016 | Hawes | B01D 29/353 210/454 |
| 2016/0257575 A1* | 9/2016 | Hawes | B01D 39/14 |

\* cited by examiner

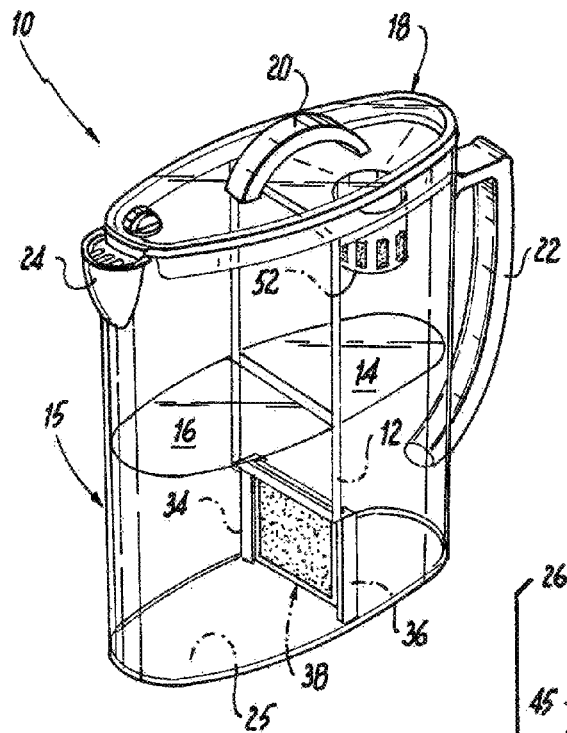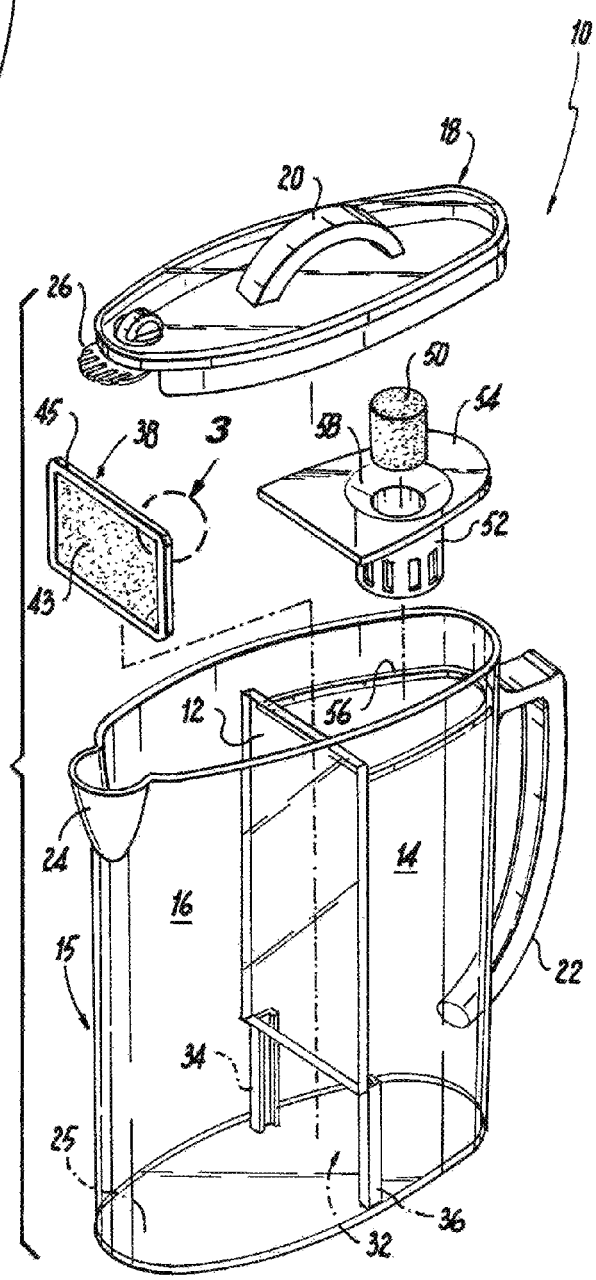

PORTABLE PITCHER FOR FILTERING AND DISPENSING DRINKING WATER

CROSS-REFERENCE TO RELATED APPLICATION

The subject invention claims the benefit of priority from U.S. Provisional Patent Application Ser. No. 62/128,549 filed Mar. 5, 2015, the disclosure of which is herein incorporated by reference in its entirety.

BACKGROUND OF THE INVENTION

1. Field of the Invention

The subject invention is directed to a fluid filtration device, and more particularly, to a portable pitcher or carafe-type device for filtering and dispensing drinking water, which includes a replaceable filter element capable of removing micro-organisms from the water.

2. Description of Related Art

Drinking water in many areas of the world contains dissolved chemicals and suspended particulate material, as a consequence of run-off and environmental contamination. Some of these chemicals and particulates have been associated with adverse physiological effects. Others have been associated with less than desirable taste and sensory perceptions.

To reduce particulate and chemical contamination, drinking water is frequently treated by chemical processes. However, these processes may introduce other types of undesirable chemical contaminants into the water. Chemicals, such as bromine and chlorine, are also frequently added to water to act as a sanitizing agent. The dangers associated with these chemicals have been questioned.

There is a general view that municipal water treatment plants often fail to adequately deal with these problems. To improve water quality, many residences and businesses now employ on-site water filters to improve the water consumed therein.

Most systems for improving water quality use a series of filters. Filtration is the process of separating particles from a fluid suspension by use of a porous medium or by means of a medium possessing chemical properties, such as hydrophobicity, electrostatic charge, etc., which permit the medium to interact with and hold the particles to be separated from the fluid, while permitting the fluid to pass there through.

Chemical contaminants are often removed by filters through chemical absorption into, or adsorption onto, the surface of the filter medium. Optimally, it is desired that the filter medium retains most of the suspended particles and many of the chemical contaminants, but allows the fluid being filtered to pass through unimpeded. Flow across the filter medium is generally achieved by the application of a driving force, usually in the form of a pressure difference across the filter, which may be generated by external pressure applied upstream, a vacuum applied downstream, gravity, or another force.

Fluid filters are often constructed in the form of relatively rigid replaceable filter units or "filter cartridges." Filter cartridges often employ granular activated carbon elements in their construct. Granular activated carbon is useful for removing organic chemicals such as chlorine, hydrogen sulfide, pesticides, herbicides, phenol, chlorophenol and hydrocarbon from water. Other filter elements may be employed in the cartridge construct to help, for example, to remove sediments such as rust and other particles. Silver is sometimes impregnated into one or more filter element to inhibit bacterial growth. Ion exchange resins may also be employed.

While filter cartridges containing granular activated carbon are known to be good at removing contaminants that affect taste, odor of the filtrate, and visible particulate matter, such filter cartridges generally are not fine enough to remove bacteria or viruses. Water may be contaminated with a number of micro-organisms including pathogenic bacteria, amoebae, flagellates, viruses and protozoa. In fact, as some water remains inside carbon granules after filtration, stagnant water in the carbon granules may act as a breeding ground for micro-organisms. Therefore, water discharged after a long period of non-use of a carbon-based filter cartridge may be contaminated with living organisms.

Recognizing that prior art filter cartridges which incorporate only a single filter medium, in particular a carbonaceous medium, suffer from the inability to remove many of the contaminants found in water, there have been developed filter assemblies employing a plurality of filter media. For example, filter assemblies have been developed that include an outer cylindrical filter structure with porosity to remove particulate matter, an inner cylindrical sorbent structure for sorbing chemical contaminants, and an inner-most cylindrical microbiological filter, preferably comprising a microporous membrane or a microporous fiber bundle for removing microorganisms. By moving water through the assembly, from the outer structure to the inner structure, particulates are removed, chemicals are adsorbed or absorbed, and microorganisms are filtered out.

Many on-site water filters are designed to be mounted in a permanent housing coupled to a water stream. These permanent housings are often located in relatively poorly accessible locations, such as under a sink or in the basement of a home, and often require special tools in order to gain access to the filter residing in the housing. While on-site permanent filters are often perceived to remediate the water sufficiently for everyday use, there are a growing number of people who demand cleaner and more tasteful water for consumption.

Rather than adding new types of filters into permanent-type on-site water filter housings or increasing the number of such housings, to provide for a more convenient manner of coupling filters to water streams and of changing filters, self-contained filtration pitchers or carafes have been developed for household use. The pitchers or carafes utilize replaceable filters and are designed as gravity fed devices.

The filters used in these devices are typically designed to be disposable. One commonplace type of disposable filter is in the form of a solid porous cylinder having a hollow center. When such filters are employed, the fluid to be filtered flows radially through the wall of the cylinder, between its exterior and hollow core. Such filters are generally capped at each end with a boundary sealing cap to permit sealing between the filter and its housing to ensure that only fluid having passed through the wall of the filter cylinder and into the hollow core is permitted to exit from the filtration unit.

Typically, these disposable filter elements use granular activated carbon media. As noted above, while carbonaceous filter elements are known to be good at removing contaminants that affect taste, odor of the filtrate, and visible particulate matter, such filters generally are not fine enough to remove bacteria or viruses.

Accordingly, there is a need in the art for a gravity fed pitcher or carafe type filtration apparatus with a removable and replaceable filter that includes filter media configured to remove bacteria and viruses from drinking water.

SUMMARY OF THE INVENTION

The subject invention is directed to a new and useful apparatus for filtering and dispensing drinking water that is capable of removing bacteria and viruses from the drinking water. The apparatus includes a container having an interior space with a dividing wall defining a first chamber for receiving unfiltered water and a second chamber for storing filtered drinking water. A passage is formed through the interior wall of the container adjacent a bottom surface thereof to provide fluid communication between the first and second chambers.

At least one multi-layered filter pack is disposed across the passage to filter water flowing from the first chamber to the second chamber under the force of gravity. The multi-layered filter pack preferably contains a plurality of filter media layers arranged in series. The multi-layered filter pack may contain at least one pre-filtration layer, and at least one bacteria retention layer and/or at least one virus retention layer. Preferably, the pre-filtration layer is on an upstream side of the filter pack to remove relatively large contaminants from the water.

Preferably, the bacteria retention layer is a nanofiber membrane layer formed of an electrospun polymer resin, such as, for example, Polyacrylonitrile (PAN), and it includes a substrate made of polyethylene terephthalate (PET). Preferably, the virus retention layer is a positively charged microporous media layer that includes a porous substrate with a cross-linked polymer coating, wherein the porous substrate is made of glass fiber or a similar material.

It is envisioned that a plurality of filter packs can be arranged in series across the passage in the dividing wall of the container, with at least one filter pack having a multi-layered construction and another containing a carbon filter media and/or an ion exchange media layer.

It is also envisioned that the apparatus could include an optional pre-filter cartridge that would be operatively associated with the first chamber for removing relatively large particulates from the water introduced into the first chamber upstream from the at least one filter pack. The pre-filter cartridge would be seated in a well formed above the first chamber.

The apparatus preferably includes a cover means. The cover means could be a single cover member associated with both the first chamber and the second chamber, or each chamber could have a respective cover associated therewith. The container also includes a handle adjacent the first chamber and a spout associated with the second chamber.

These and other features of the apparatus of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make, use and assembly the portable pitcher of the subject invention without undue experimentation, preferred embodiments thereof will be described in detail herein below with reference to certain figures, wherein:

FIG. 1 is a perspective view of a portable pitcher for filtering and dispensing water constructed in accordance with a preferred embodiment of the subject invention, with a quantity of water contained therein;

FIG. 2 is an exploded perspective view of the pitcher shown in FIG. 1, with parts separated for ease of illustration;

DESCRIPTION OF THE PREFERRED EMBODIMENTS

Figure 3:
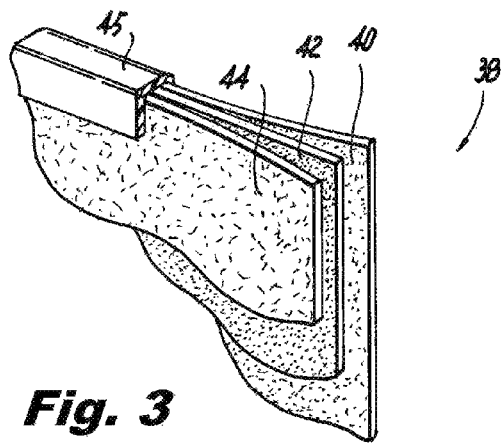
FIG. 3 is a localized cut away view of the multi-layered filter element which is shown in FIG. 2.

Referring now to the drawings, wherein like reference numerals identify similar structural features or aspects of the subject invention, there is illustrated in FIG. 1 a new and useful portable water pitcher assembly for filtering and dispensing drinking water, which is designated generally by reference numeral 10. As explained in more detail below, the pitcher 10 is particularly adapted and configured to remove contaminants and micro-organisms from drinking water.

Referring now to FIG. 1, the pitcher assembly 10 includes a fluid container 15 formed from a transparent thermoplastic material having a fluid volume capacity of about between one quart and one gallon. Thermoplastics that are generally considered safe for food and drink include high density polyethylene (HDPE), low density polyethylene (LDPE) and polypropylene (PP). The container 15 has an interior space with an interior dividing wall 12 defining a first chamber 14 for receiving unfiltered water and a second adjacent chamber 16 for storing filtered drinking water.

The pitcher assembly 10 includes a removable fitted cover assembly 18 for container 15. As illustrated, in the figures, cover assembly 18 is a single cover member with a hand grip 20 associated with both the first chamber 14 and the second chamber 16. Alternatively, each chamber 14, 16 could have a separate removable cover member associated therewith. The container 15 also includes a handle 22 adjacent the side of the first chamber 14 for carrying or otherwise holding the pitcher assembly 10. The handle 22 can be integrally formed and made of the same material as the container 15 or it can be made from a different material and attached to the container 15 of pitcher assembly 10.

The container 15 of pitcher assembly 10 also includes a spout 24 associated with the upper portion of the second chamber 16 for dispensing filtered water therefrom. A strainer 26 is provided on the cover assembly 18, positioned to cooperate with the spout 24 in the event that ice or other ingredients, such as fruit or berries are included in the second chamber 16, to cool or add flavor to the filtered water contained therein.

Referring to FIG. 2, a rectangular passage 32 is formed through the interior dividing wall 12 adjacent a bottom surface 25 of the container 15 to provide fluid communication between the first chamber 14 and the second chamber 16. The rectangular passage 32 is bordered by opposed spaced apart retention channels 34 and 36. The retention channels 34, 36 are adapted and configured to receive and removably retain a replaceable multi-layered filter pack 38. The filter pack 38 is configured to extend across the passage 32 to filter water flowing from the first chamber 14 to the second chamber 16 under the force of gravity.

The multi-layered filter pack 38 includes a rectangular filter element 43 surrounded by a rigid support frame 45 that is dimensioned and configured to cooperate with the opposed retention channels 34 and 36 associated with passage 32. Preferably, the filter element 43 of filter pack 38 contains a plurality of filter media layers arranged in series, as best seen in FIG. 3. More particularly, the multi-layered filter pack 38 preferably contains at least one pre-filtration layer 40, and at least one bacteria retention layer 42 and/or at least one virus retention layer 44. Multi-layered filter media arranged in such a manner is disclosed in commonly assigned U.S. patent application Ser. No. 15/052,070, the disclosure of which is incorporated herein by reference in its entirety.

Preferably, the pre-filtration layer 40 is located on an upstream side of the filter pack 38 to remove relatively large contaminants from the water. The bacteria retention layer 42 is preferably a nanofiber membrane layer formed of an electrospun polymer resin, such as, for example, Polyacrylonitrile (PAN), and it includes a substrate made of polyethylene terephthalate (PET). Preferably, the virus retention layer 44 is a positively charged microporous media layer that includes a porous substrate with a cross-linked polymer coating, wherein the porous substrate is made of glass fiber or a similar material.

It is envisioned that the filter pack 38 can contain all three types of filter media layers, a single type of filter media layer or a combination of two of the filter media layers described above. It is also envisioned that plural filter packs can be arranged in series across the passage 32, with at least one filter pack having a multi-layered construction as described above, and another containing a carbon filter media and/or an ion exchange media layer.

While not required to achieve a desired level of filtration, it is further envisioned that the pitcher assembly 10 can include an optional replaceable or otherwise removable pre-filter cartridge or element 50 operatively associated with the first chamber 14, as illustrated in the figures. The cylindrical pre-filter cartridge or element 50 can be formed by pleated filter media or it can be formed from a porous material, such as, for example, carbon block, or a similar porous media. Carbon can remove sediment, lead, and chlorine in a single-pass filtration process that meets NSF Class I standards. The carbon that is used should have an optimal pore size that minimizes flow resistance while still allowing enough residence time for removal of chlorine and lead.

The pre-filter 50 is positioned to filter water introduced into the first chamber 14, upstream from the filter pack 38. The pre-filter 50 is preferably seated in a housing or well 52 supported on a platform 54 that is retained on a ledge 56 formed about the upper periphery of the first chamber 14. The platform 54 has a tapered surface 58 for directing the flow of water into the well 52.

Figure 4:
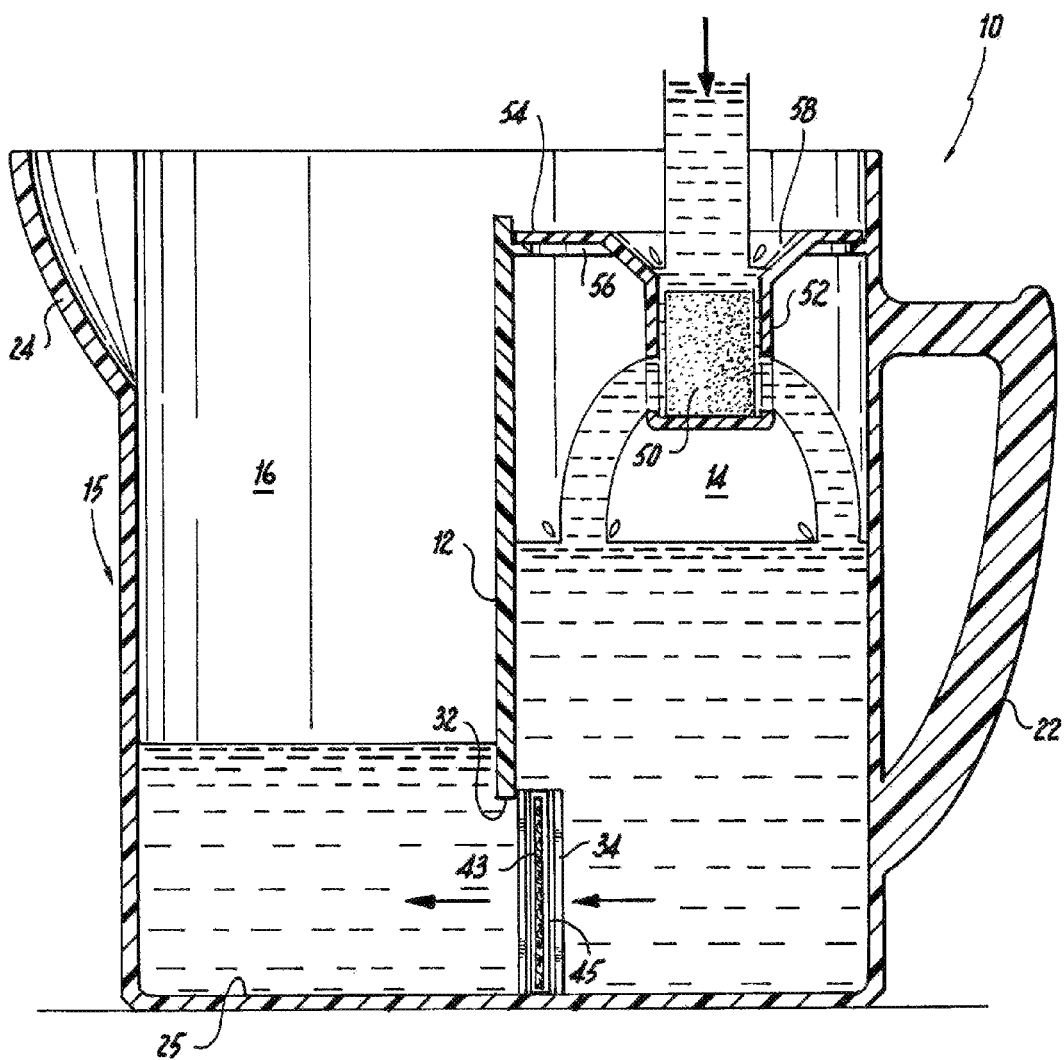
FIG. 4 is a vertical cross-sectional view of the portable pitcher shown in FIG. 1, as it is being filled with water.

Referring to FIG. 4, in use, unfiltered water is introduced into the first chamber 14, preferably but not necessarily through the pre-filter element 50. As the water passes through the pre-filter element 50 and accumulates within the first chamber 14, the force of gravity causes the pre-filtered water to flow through the rectangular multi-layered media filter pack 38 that extends across the passage 32, into the second chamber 16. Water will continue to pass from the first chamber 14 to the second chamber 16, until the head pressure in chamber 14 equals the head pressure in chamber 16, at which point the system will be in equilibrium. Thereafter, filtered water accumulated in the second chamber 16 can be dispensed from the second chamber 16 by way of spout 30.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. The apparatus for filtering and dispensing drinking water comprising:
a container having an interior space with a dividing wall defining a first chamber for receiving unfiltered water and a second chamber for storing filtered drinking water, wherein a passage is formed through the dividing wall adjacent a bottom surface of the container to provide fluid communication between the first chamber and the second chambers, and wherein at least one removable multi-layered filter pack is disposed across the passage to filter water flowing from the first chamber to the second chamber under force of gravity; and
a pre-filter seated in a well formed above the first chamber for removing relatively large particulates from the water introduced into the first chamber upstream from the at least one removable multi-layered filter pack.

2. The apparatus as recited in claim 1, wherein the at least one removable multi-layered filter pack contains a plurality of filter media layers arranged in series.

3. The apparatus as recited in claim 2, wherein the at least one removable multi-layered filter pack contains at least one pre-filtration layer.

4. The apparatus as recited in claim 3, wherein the at least one pre-filtration layer is a glass fiber pre-filtration layer.

5. The apparatus as recited in claim 2, wherein the at least one removable multi-layered filter pack contains at least one bacteria retention layer.

6. The apparatus as recited in claim 5, wherein the bacteria retention layer is a nanofiber membrane layer.

7. The apparatus as recited in claim 6, wherein the nanofiber membrane layer is formed of an electrospun polymer resin.

8. The apparatus as recited in claim 7, wherein the electrospun polymer resin is Polyacrylonitrile (PAN).

9. The apparatus as recited in claim 6, wherein the nanofiber membrane layer includes a substrate made of polyethylene terephthalate (PET).

10. The apparatus as recited in claim 2, wherein the at least one removable multi-layered filter pack contains at least one virus retention layer.

11. The apparatus as recited in claim 10, wherein the at least one virus retention layer is a positively charged microporous media layer.

12. The apparatus as recited in claim 11, wherein the positively charged microporous membrane layer includes a porous substrate with a cross-linked polymer coating.

13. The apparatus as recited in claim 12, wherein the porous substrate of the at least one virus retention layer is made of glass fiber.

14. The apparatus as recited in claim 1, wherein a cover is associated with the first chamber and the second chamber.

15. The apparatus as recited in claim 1, wherein the container includes a handle adjacent the first chamber and a spout associated with the second chamber.

* * * * *